(12) United States Patent
Lamoree et al.

(10) Patent No.: US 7,601,004 B2
(45) Date of Patent: Oct. 13, 2009

(54) SYSTEM AND METHOD FOR PIVOT FOR STOWAGE COMPARTMENTS OR ROTATING ITEMS

(75) Inventors: Bret L. Lamoree, Snohomish, WA (US); Dennis C. Lin, Everett, WA (US); Heidi J. Kneller, Bellevue, WA (US); Brock J. Prince, Seattle, WA (US)

(73) Assignee: The Boeing Company, Chicago, IL (US)

( * ) Notice: Subject to any disclaimer, the term of this patent is extended or adjusted under 35 U.S.C. 154(b) by 251 days.

(21) Appl. No.: 11/510,821

(22) Filed: Aug. 25, 2006

(65) Prior Publication Data

US 2007/0018043 A1    Jan. 25, 2007

Related U.S. Application Data

(63) Continuation-in-part of application No. 10/905,502, filed on Jan. 7, 2005, now Pat. No. 7,128,295.

(51) Int. Cl.
*B64D 11/00* (2006.01)

(52) U.S. Cl. .............. 439/11; 439/21; 244/118.1; 244/118.5; 16/266

(58) Field of Classification Search .......... 439/11, 439/21; 244/118.1, 118.5; 16/266
See application file for complete search history.

(56) References Cited

U.S. PATENT DOCUMENTS

| 620,551 | A | | 2/1899 | Porter |
|---|---|---|---|---|
| 750,376 | A | | 1/1904 | Lampitt |
| 2,445,399 | A | | 7/1948 | Johnson |
| 3,656,801 | A | | 4/1972 | Doutt et al. |
| 4,597,599 | A | | 7/1986 | Bisbing |
| 5,045,656 | A | | 9/1991 | Kojima |
| 5,398,783 | A | | 3/1995 | Jacoby |
| 5,441,218 | A | | 8/1995 | Mueller et al. |
| 5,456,529 | A | | 10/1995 | Cheung |
| 5,988,724 | A | | 11/1999 | Wolda |
| 6,116,958 | A | * | 9/2000 | Reichle .................. 439/640 |
| 6,318,671 | B1 | | 11/2001 | Schumacher et al. |
| 6,527,325 | B2 | | 3/2003 | Steingrebe et al. |
| 6,598,829 | B2 | | 7/2003 | Kamstra |
| 6,899,299 | B2 | | 5/2005 | Ritts |
| 7,128,295 | B2 | * | 10/2006 | Scown .................. 244/118.1 |
| 2006/0097034 | A1 | | 5/2006 | Rudduck et al. |

FOREIGN PATENT DOCUMENTS

EP          0 737 147          12/1999

OTHER PUBLICATIONS

Simmons, G. and Worden, L. "Overhead Storage Bins" printed from Internet website: http://www.boeing.com/commercial/aeromagazine/aero_15/overhead_..., Nov. 23, 2004.

* cited by examiner

*Primary Examiner*—Gary F. Paumen
(74) *Attorney, Agent, or Firm*—Harness, Dickey & Pierce, P.L.C.

(57) ABSTRACT

In one embodiment a pivot system is disclosed that has a pivot boss including an engagement extension. A race assembly including a socket for receipt of the engagement extension may be used to couple the pivot boss to the race assembly. At least one conductor may be coupled to at least one of the pivot boss and the race assembly to enable electrical communication between the pivot boss and the race assembly.

15 Claims, 10 Drawing Sheets

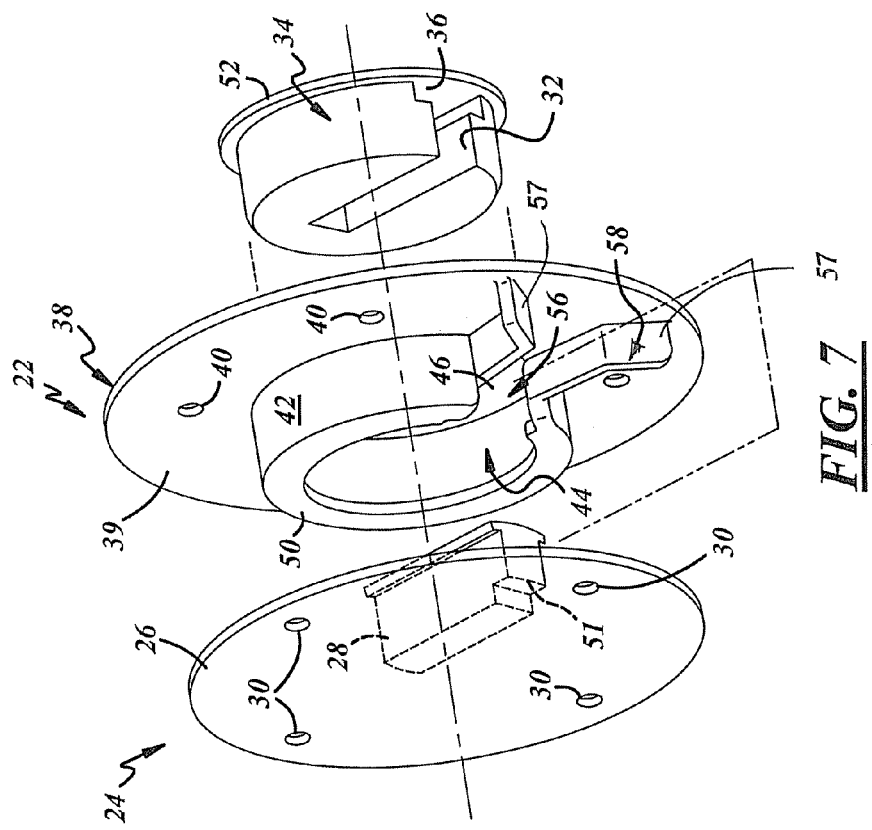
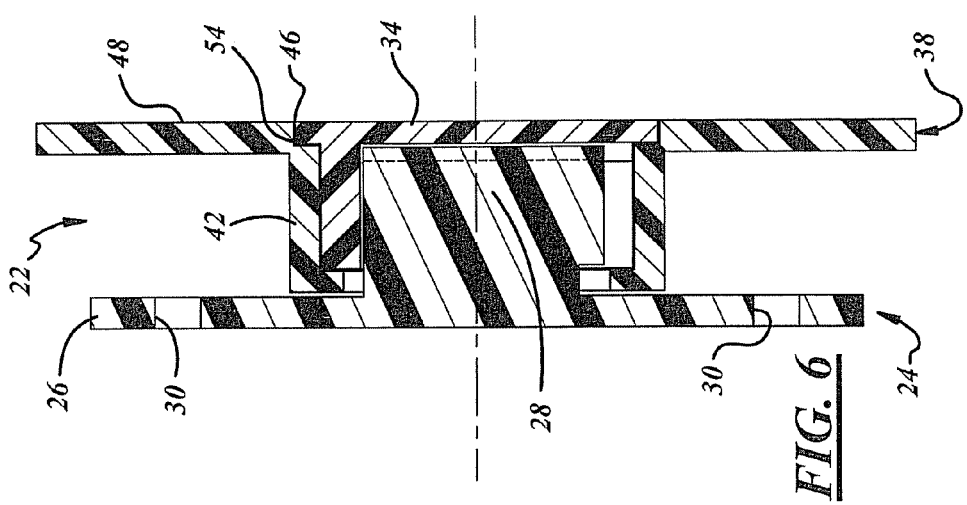

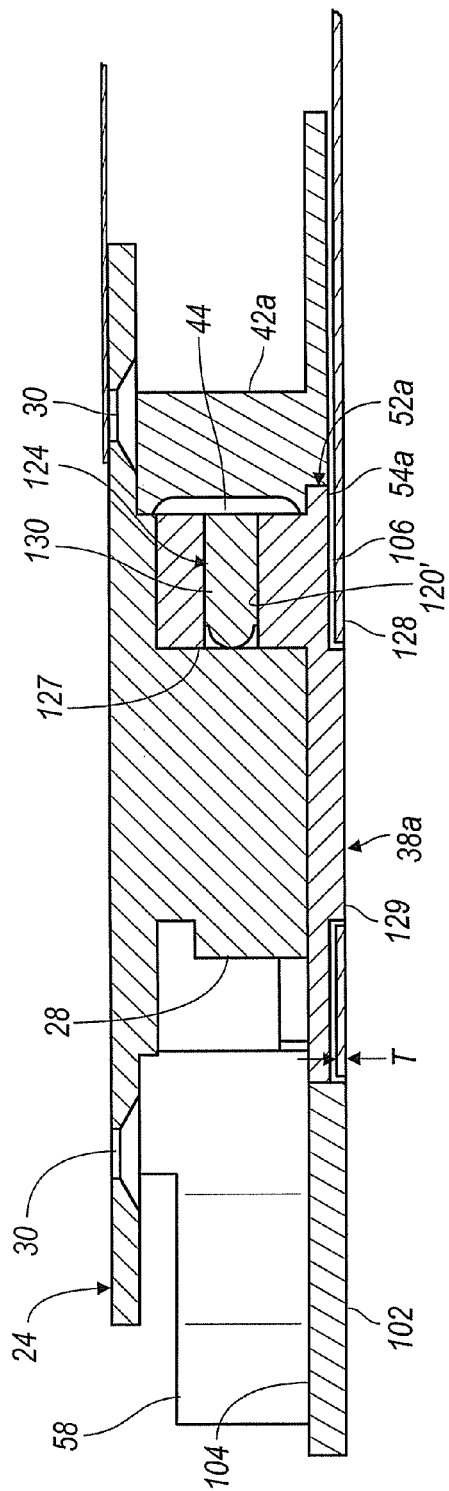
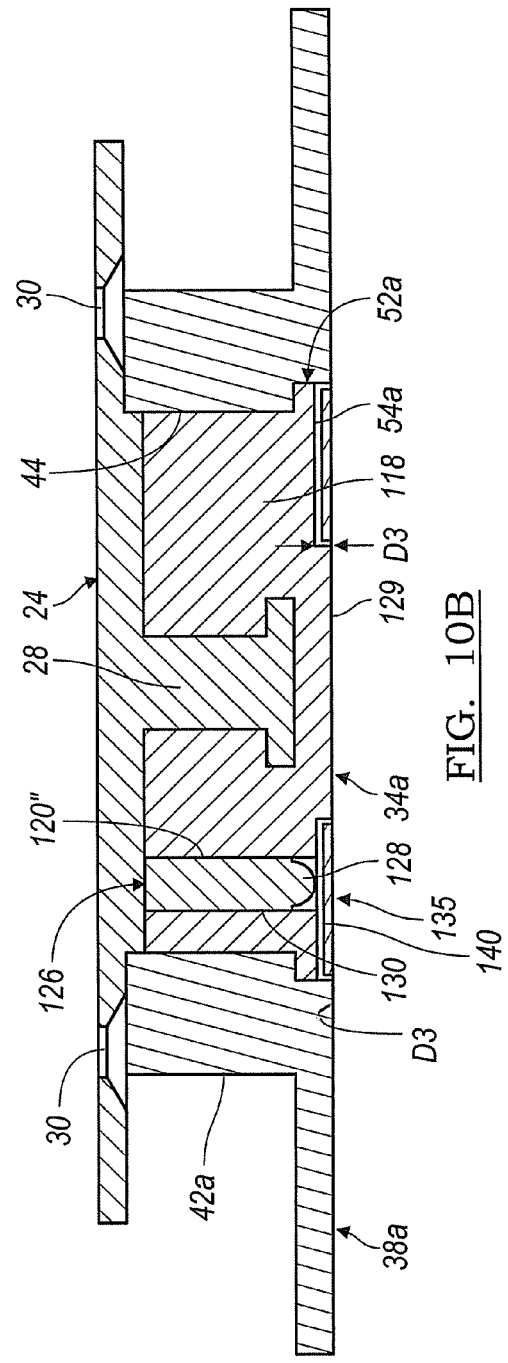
FIG. 10A
FIG. 10B

SYSTEM AND METHOD FOR PIVOT FOR STOWAGE COMPARTMENTS OR ROTATING ITEMS

CROSS-REFERENCE TO RELATED APPLICATIONS

This application is a continuation-in-part of U.S. patent application Ser. No. 10/905,502 filed on Jan. 7, 2005 now U.S. Pat. No. 7,128,295. The disclosure of the above application is incorporated herein by reference.

The present application is related in general subject matter to pending U.S. patent application Ser. No. 11/510,779, filed on Aug. 25, 2006, entitled "System and Method for a Power-Assisted Compartment," assigned to The Boeing Company, and hereby incorporated by reference in its entirety into the present application. The present application is also related in general subject matter to pending commonly assigned U.S. patent application Ser. No. 11/510,787, filed on Aug. 25, 2006, entitled "System and Method for an Electronic Interactive Switch," hereby incorporated by reference in its entirety into the present application. Further, the present application is related in general subject matter to pending commonly assigned U.S. patent application Ser. No. 11/510,780, filed Aug. 25, 2006, entitled "System and Method for Compartment Control," hereby incorporated by reference in its entirety into the present application. The present application is further related in general subject matter to pending commonly assigned U.S. patent application Ser. No. 11/510,788, filed on Aug. 25, 2006, entitled "System and Method for Compartment Control," hereby incorporated by reference in its entirety into the present application. Also, the present application is also related in general subject matter to pending commonly assigned U.S. patent application Ser. No. 11/510,790, filed on Aug. 25, 2006, entitled "System and Method for Compartment Control," hereby incorporated by reference in its entirety into the present application. The present application is also related in general subject matter to pending commonly assigned U.S. patent application Ser. No. 11/510,792, filed on Aug. 25, 2006, entitled "System and Method for Electronically Latching Compartments," hereby incorporated by reference in its entirety into the present application.

FIELD

The present disclosure relates to a pivot system and more particularly to a pivot system allowing for the quick installation of aircraft stowage compartments or similar rotating items.

BACKGROUND

The statements in this section merely provide background information related to the present disclosure and may not constitute prior art.

Many mobile platforms (such as trains, ships, aircraft and busses) employ stowage compartments in a cabin of the mobile platform to enable stowage of passenger items, such as carry-on baggage. With regard to commercial passenger aircraft, increased baggage stowage demands have required the stowage compartments to increase in size and load capacity. In addition, there is a drive to increase passengers "personal space" (i.e., headroom) in the cabin of the aircraft. The desire for increased "personal space" in the cabin has resulted in higher ceilings and the placement of storage compartments higher in the cabins.

The placement of stowage compartments at a higher position in the cabin can necessitate the use of additional equipment to install the compartments at the necessary height. In addition, in certain cases it may be desirable to remove and replace the stowage compartments. Accordingly, it would be desirable to have a stowage compartment design that provides for easy removal and replacement of the stowage compartments while still allowing for easy access to the stowage compartments by passengers when the stowage compartments are installed in a mobile platform.

In one aspect the present disclosure relates to a pivot system. The pivot system may comprise a pivot boss including an engagement extension. A race assembly including a socket for receipt of the engagement extension may be used to couple the pivot boss to the race assembly. At least one conductor may be coupled to at least one of the pivot boss and the race assembly to enable electrical communication between the pivot boss and the race assembly.

In another aspect the present disclosure relates to a method for communicating between a first structure and a second structure through a pivot assembly, where the second structure is movable relative to the first structure. The method may comprise providing a pivot boss including an engagement extension, a race assembly including a race element defining a socket and a central engagement bushing including an engagement chamber for receipt of the engagement extension, and at least one conductor. The method may involve coupling the central engagement bushing to the socket and coupling the race element to the first structure. The pivot boss may be coupled to the second structure. A conductor may be coupled to the first structure and the second structure. The engagement extension may be coupled to the engagement chamber to enable electrical communication between the first structure and the second structure.

In another aspect the present disclosure relates to a pivot system that may comprise a pivot boss including an engagement extension, a race element including a socket, and a central engagement bushing. The central engagement bushing may be rotatably secured within the socket to enable the race element to rotate relative to the pivot boss while remaining longitudinally engaged to the pivot boss. The central engagement bushing may include a body having a flange, the body defining an engagement chamber above the flange that enables the central engagement bushing to removably engage the engagement extension of the pivot boss through the race element. The body may include a first conductive biasing member that provides a point of continuous contact between the race element and the central engagement bushing. A second conductive biasing member may be included that provides a point of continuous contact between the central engagement bushing and the engagement extension of the pivot boss. A sensor may be coupled to the flange of the central engagement bushing. At least one non-conductive biasing member may be coupled to the body of central engagement bushing such that the non-conductive biasing member contacts the sensor, the non-conductive biasing member contacting the sensor to enable the sensor to receive an input indicative of the rotation of the race element relative to the pivot boss.

SUMMARY

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 6 is a cross-sectional view of the pivot of FIG. 5 taken along line 6-6 of FIG. 5;

FIG. 7 is an exploded view of the pivot of FIG. 5;

FIG. 10A is a cross-sectional view of the pivot of FIG. 9 taken along line 10A-10A of FIG. 9;

FIG. 10B is a cross-sectional view of the pivot of FIG. 9 taken along line 10B-10B of FIG. 9;

DETAILED DESCRIPTION

The following description is merely exemplary in nature and is not intended to limit the present disclosure, application, or uses. Although the following description is related generally to a power-assisted compartment for a mobile platform (such as an aircraft, ship, spacecraft, train or land-based motor vehicle), it will be understood that the power-assisted compartment system, as described and claimed herein, can be used with any appropriate application where it would be useful to have communication and/or power transmitted to a rotatable storage area or storage device. Therefore, it will be understood that the following discussion is not intended to limit the scope of the appended claims to only mobile platforms, since the power-assisted compartment system could just as readily be employed in buildings or other fixed structures.

Figure 1:
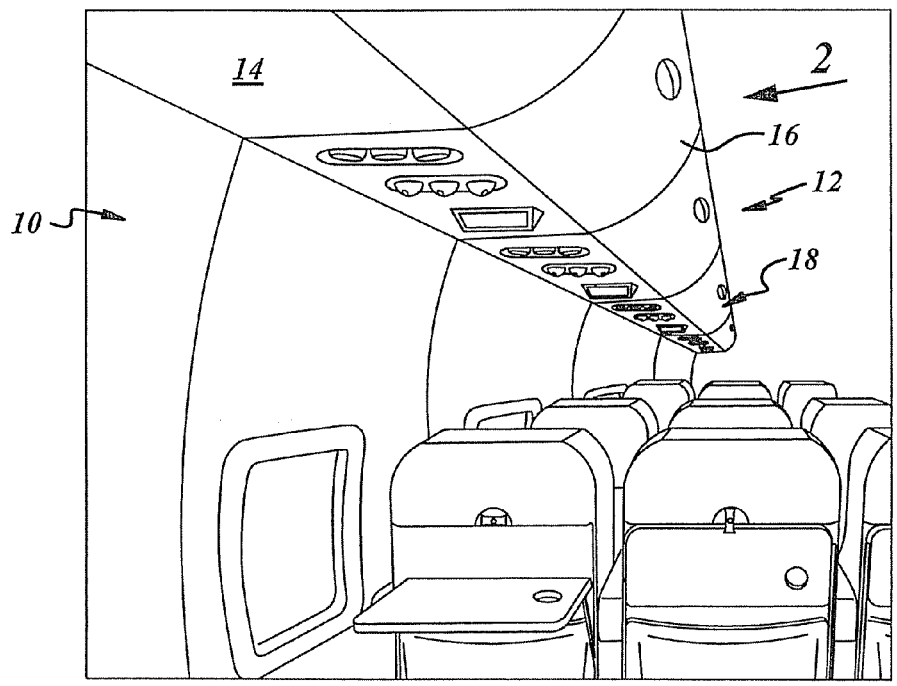
FIG. 1 is a perspective view of a portion of a mobile platform incorporating one embodiment of a compartment pivot system according to the present disclosure.
Figure 5:
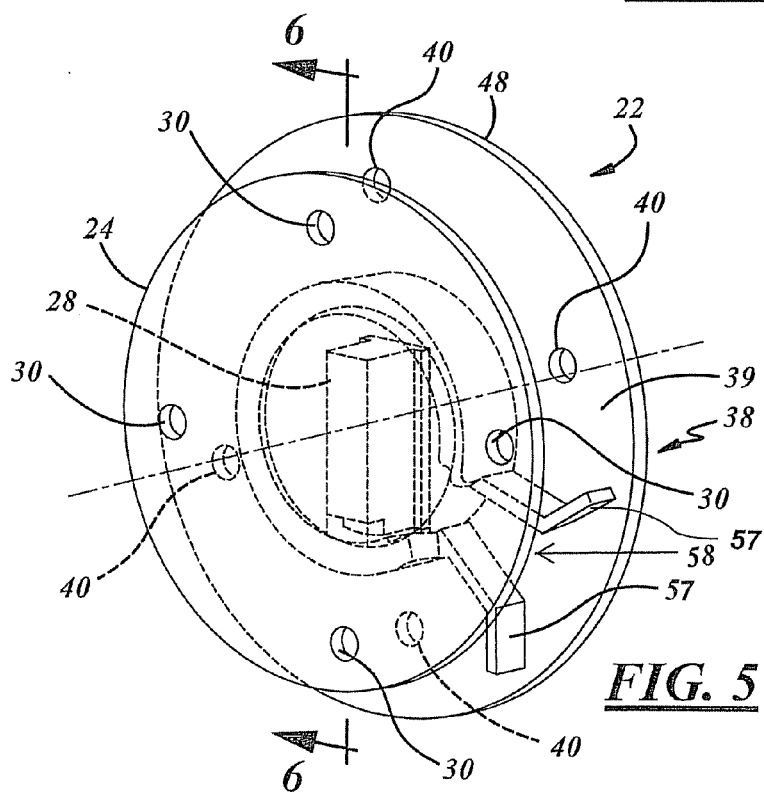
FIG. 5 is a side view of the pivot of FIGS. 1-5.
Figure 3:
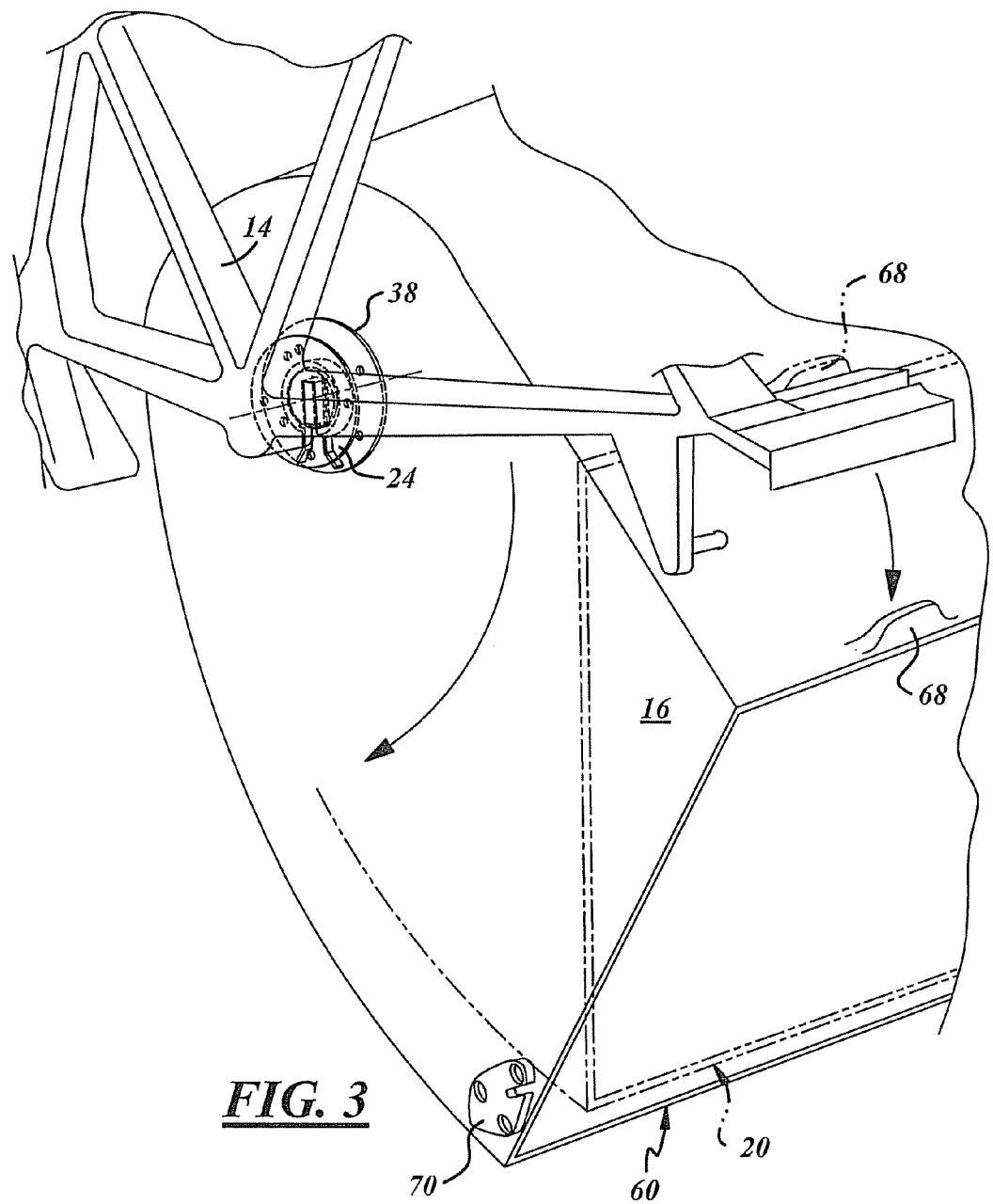
FIG. 3 is perspective view of the compartment of FIG. 1 in both the installation position and the opened position.

Referring now to FIG. 1, an illustration of a mobile platform interior, such as an aircraft interior 10, in accordance with the present disclosure is shown. The interior 10 includes a compartment assembly 12 in which passengers may store carry-on baggage and airline crew may store blankets and other sundries. The compartment assembly 12 is comprised of an interior overhead structure 14 and a plurality of overhead compartment elements 16 (typically referred to as "stowage bins" when used in a commercial aircraft application). The compartments 16 are rotatably mounted to the interior overhead structure 14 such that they can be rotated between a compartment closed position 18 and a compartment opened position 20 (see FIG. 3).

The present disclosure provides not only a unique and novel approach to rotatable mounting of a stowage compartment, but further provides improvements to the installation and removal of a selected compartment 16 from the interior overhead structure 14. This is accomplished through the use of a unique pivot system or assembly 22 as shown in FIGS. 2-7. A pair of such pivot assemblies 22 may be utilized on each compartment 16 and interior overhead structure 14 interface. Alternately, a single pivot assembly 22 may be used in combination with an alternate rotational mount to reduce complexity.

Referring specifically to FIG. 7, each pivot assembly 22 is comprised of a first pivot boss 24 having a fixed boss mounting base 26. An engagement extension 28 protrudes from the fixed boss mounting base 26 or from the interior overhead structure 14. The fixed pivot boss 24 may, in fact, be simply formed as a portion of the interior overhead structure 14. The first boss mounting base 26 includes a plurality of boss mounting bores 30 by which the first pivot boss 24 may be fixedly mounted to the interior overhead structure 14 or alternately to the compartment 16. Although the engagement extension 28 may be formed in a variety of shapes, it is contemplated that it is shaped to fixedly engage an engagement chamber 32 formed within a central engagement bushing 34 such that upon insertion into the engagement chamber 32, the engagement extension 28 is restrained from axial separation from the bushing 34. One particular embodiment illustrated contemplates a cross-sectional t-shaped engagement extension 28 matched with a t-shaped gap 36, 50 that the engagement extension 28 is keyed to the gap 36 once these two portions are engaged.

The central engagement bushing 34 is rotatably engaged to a first race element 38. The first race element 38 includes a fixed race mounting base 39 suitable for fixed mounting to the compartment 16 or alternately the interior overhead structure 14 by way of a plurality of race mounting bores 40. The first race element 38 includes a circular wall 42 extending from the fixed race mounting base 39 and forming a central race socket 44. The central engagement bushing 34 is rotatably secured within the socket 44. This is accomplished by inserting the central engagement bushing 34 into the socket 44 from the right in the drawing of FIG. 7. An upper flange 50 formed on the circular wall 42 and flanged inwardly traps the central engagement bushing 34 within the socket 44 once the fixed race mounting base 39 is mounted to its associated compartment 16. An upper extension notch 51 may be formed on the engagement extension 28 to prevent interference with the upper flange 50 when the first race element 38 rotates relative to the engagement extension 28. A lower bushing flange 52 may be additionally formed on the central engagement bushing 34 and adapted to correspond to an outward chamfer 54 formed at the opening 46 (FIG. 6) to provide a dual rotational guide and to further help maintain concentricity of the engagement bushing 34 in the socket 44.

In order for the engagement extension 28 to be insertable and removable from the engagement chamber 32 when the central engagement bushing 34 is positioned within the socket 44, the circular wall 42 preferably includes an entry gap 56 through which the engagement extension 28 may pass. A pair of angled arm portions 57 cooperatively forms an outwardly flanged entrance guide 58. The guide 58 may be formed as an extension of the circular wall 42 to provide a channel for inserting the engagement extension 28 into the socket 44 and into the engagement chamber 32. As the engagement chamber 32 does not pass entirely through the central engagement bushing 34, the engagement extension 28 is only insertable or removable from a single orientation when the engagement chamber 32 is aligned with the entry gap 56 (referred to as the installation position 60—see FIG. 4). The central engagement bushing 34 may be biased into the installation position 60 to facilitate even easier assembly. This may be accomplished through a variety of known methods such as weights, springs, or similar biasing methodologies. For example, a coil spring could be positioned between the engagement bushing 34 and the compartment 16 to which the first race element 38 and the engagement bushing 34 are being secured to, as these components are being secured to the compartment 16.

Figure 2:
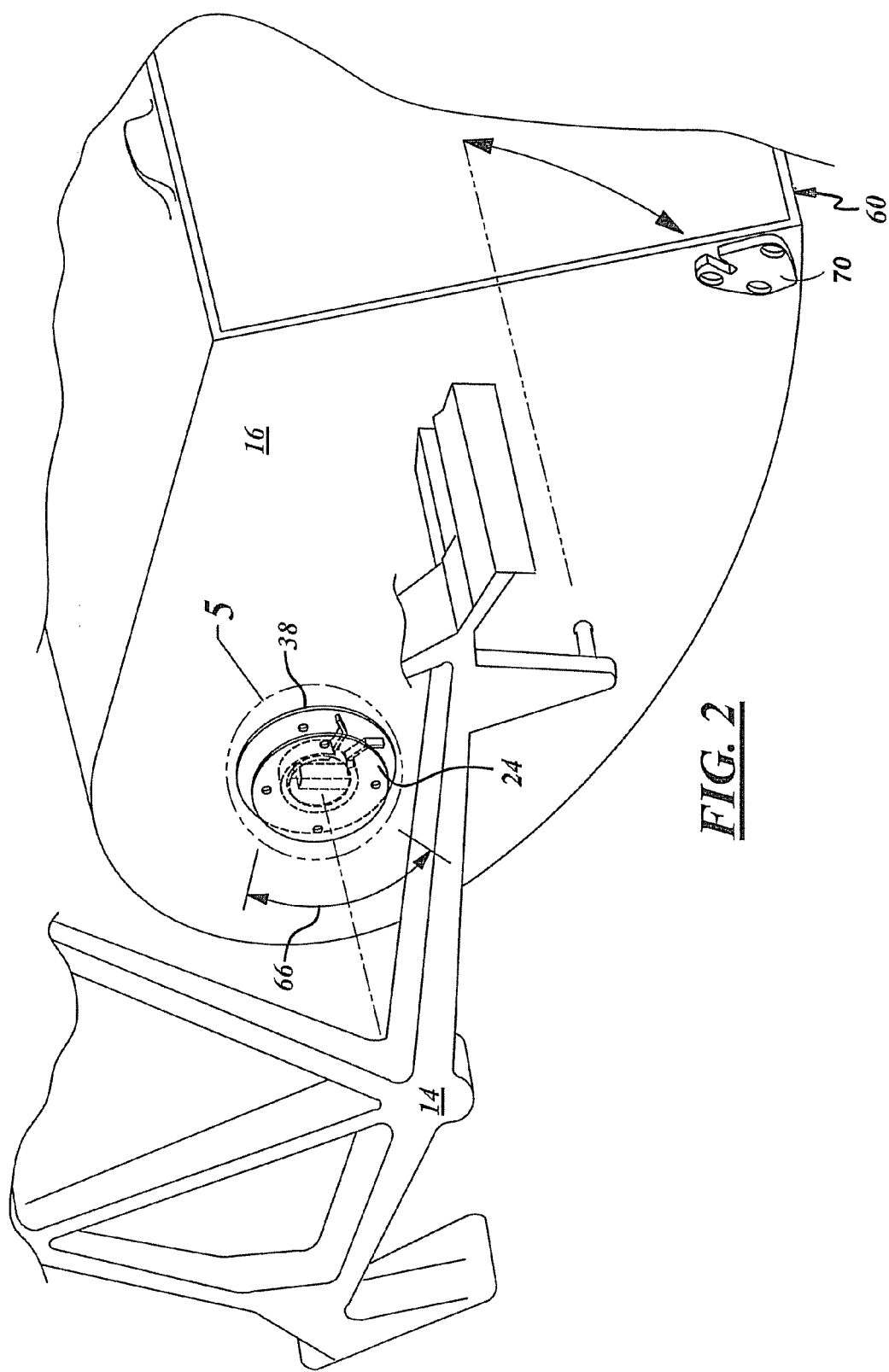
FIG. 2 is a perspective view of a compartment of FIG. 1 in a range of operating positions.
Figure 4:
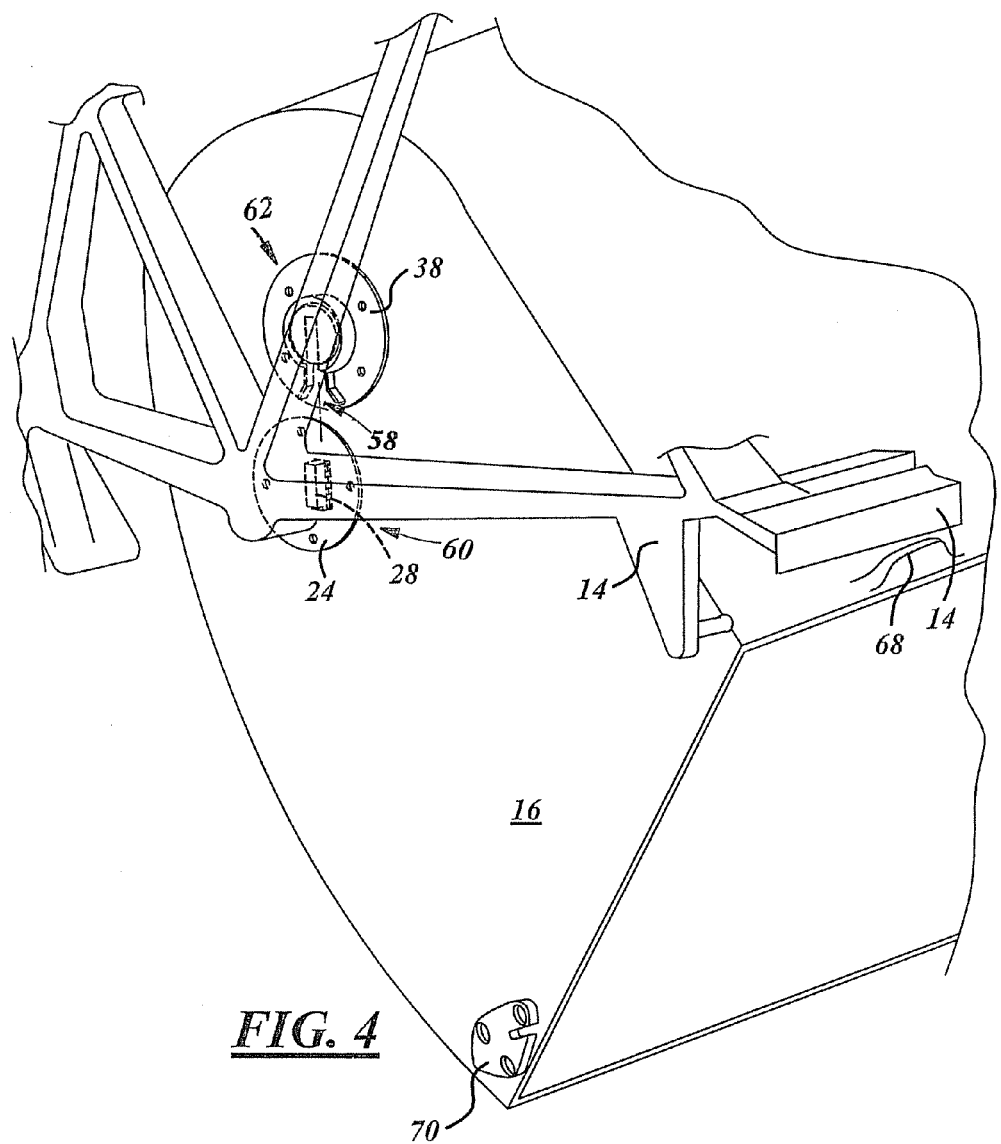
FIG. 4 is a perspective view of the compartment of FIG. 3 in the pre-install position.

After mounting of the first pivot boss 24 to the interior overhead structure 14 and the fixed race element 38 to the compartment 16, the compartment 16 is raised into the pre-install position 62 positioned directly above the fixed pivot boss 24, and vertically aligned with the engagement extension 28 (see FIG. 4). It is lowered into its installed position 60 (FIG. 3) when the engagement extension 28 is guided into the engagement chamber 32 through guide 58. The compartment 16 can then be rotated into a range of operating positions 66 (see FIG. 2). As the engagement extension 28 can only be removed when the compartment 16 is rotated into the installation position 60, the fixed pivot boss 24, fixed race 38 and engagement bushing 34 thus form the pivot assembly 22 and become an integral assembly that permits rotational movement throughout the range of operating positions 66 (FIG. 2). The compartment 16 can be raised, therefore, into the compartment opened position 20 and prevented from unintentional movement back into the installation position 60 by way of at least one stop element 68 (FIG. 4) formed on the compartment 16 that engages the interior overhead structure 14. Although a particular stop element 68 has been described, a variety of mechanisms for limiting rotational movement of the compartment 16 could easily be implemented. Similarly, a variety of latch assemblies may be used to secure the compartments 16 into the compartment closed position 18.

The present disclosure, thereby, provides a unique pivot assembly 22 that allows assembly of the compartment assembly 12 without the need for tooling or complex assembly procedures. Similarly, the compartment 16 may be removed simply by forcing the stop elements 68 past the compartment opened position 20 (FIG. 3), where after it may be lifted from the fixed pivot boss 24. The present disclosure therefore simplifies and improves compartment assembly design and assembly.

Figure 8:
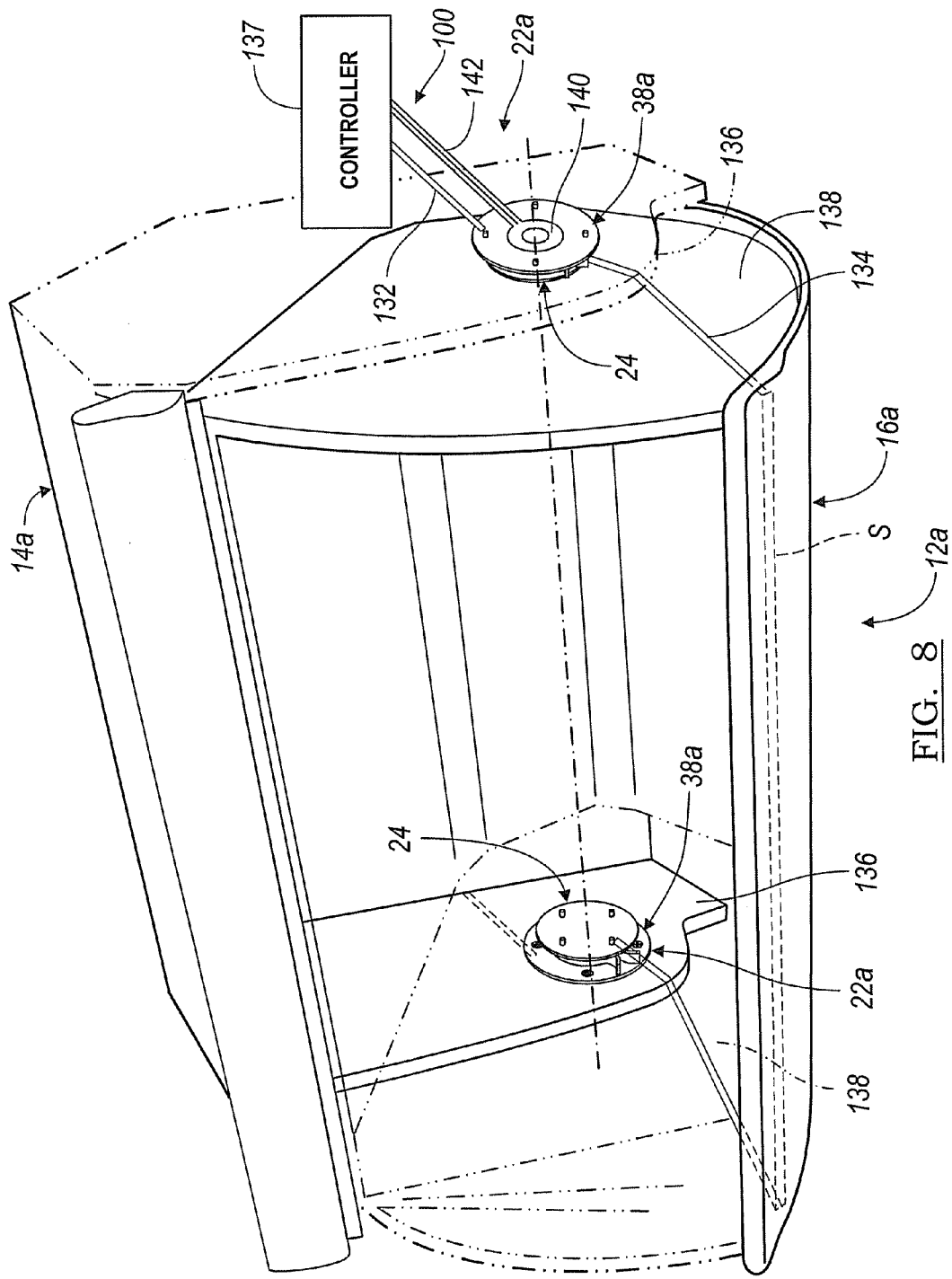
FIG. 8 is a perspective view of an alternative pivot for use with an exemplary alternative compartment.
Figure 9:
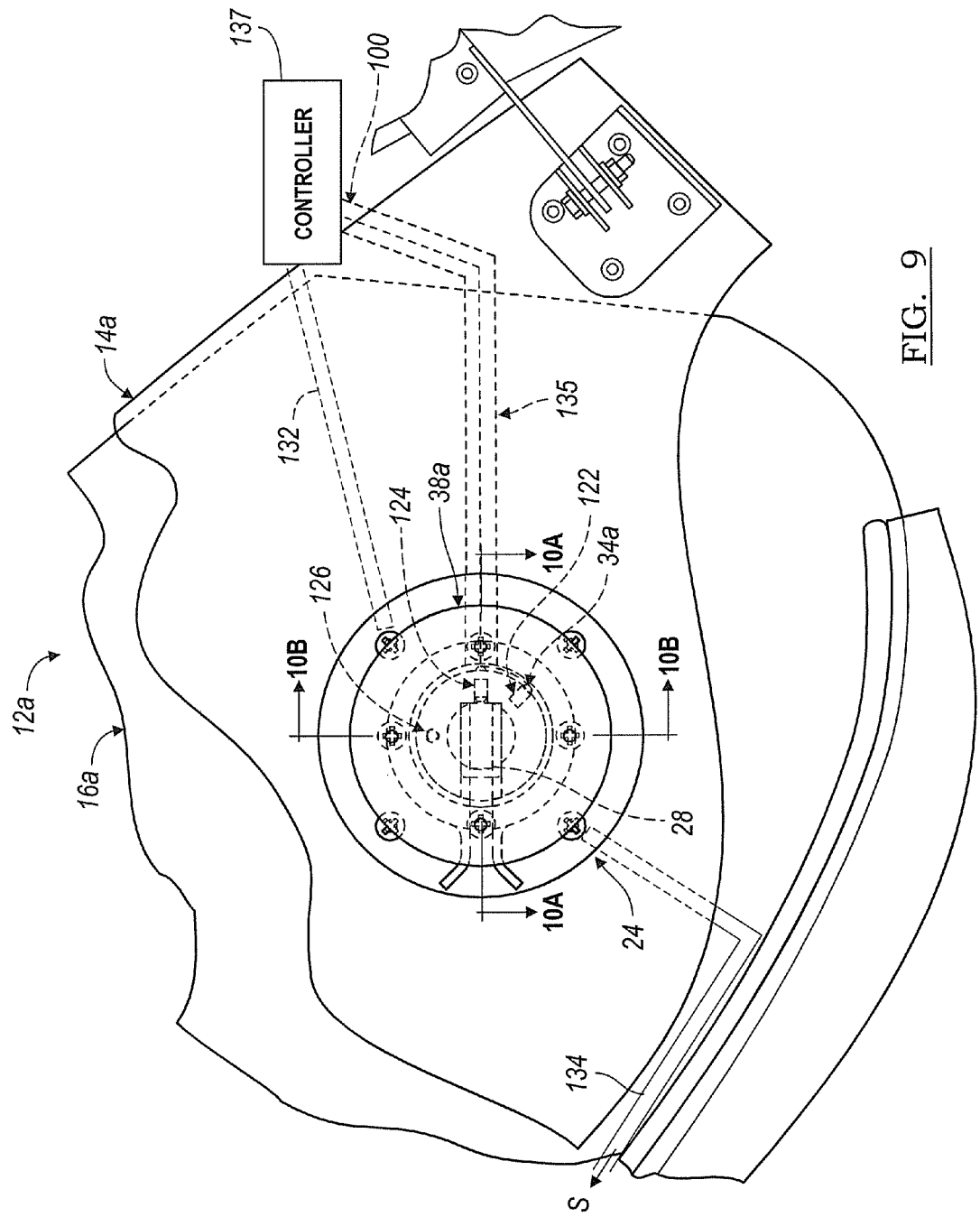
FIG. 9 is a side view of the alternative pivot of FIG. 8.

With reference now to FIGS. 8 and 9, an alternative pivot system 22a is shown. The alternative pivot system 22a includes the pivot boss 24, a race element 38a, a central engagement bushing 34a and a communication system 100 for use with an interior overhead structure 14a and a compartment 16a, substantially similar to that described with regard to FIGS. 1-4. The alternative pivot system 22a enables communication between the interior overhead structure 14a and the compartment 16a, such that data and/or power can be continuously transmitted between the interior overhead structure 14a and the compartment 16a even during the rotation of the compartment 16a, with respect to the interior overhead structure 14a.

It should be noted that the pivot boss 24, race element 38a and central engagement bushing 34a can each be composed of a conductive material, such as a conductive polymer, metal, metal alloy or combinations thereof, while the interior overhead structure 14a and compartment 16a are formed of a non-conductive material, such as a non-conductive polymer. In the alternative, the alternative pivot system 22a can be electrically isolated from the interior overhead structure 14a and the compartment 16a. Generally, the pivot boss 24 is coupled to the compartment 16a, the race element 38a is coupled to the interior overhead structure 14a and the central engagement bushing 34a couples the pivot boss 24 to the race element 38a.

As the pivot boss 24 of the alternative pivot system 22a is identical to the pivot boss 24 of the pivot assembly 22, the pivot boss 24 will not be discussed in detail with regard to the alternative pivot system 22a. In addition, as the race element 38a and the central engagement bushing 34a are substantially similar to the race element 38 and the central engagement bushing 34 of the pivot assembly 22, as discussed with regard to FIGS. 1-7, only the modifications to the race element 38a and the central engagement bushing 34a will be discussed herein. It should be noted that the race element 38 and central engagement bushing 34 can make up a race assembly.

Figure 11A:
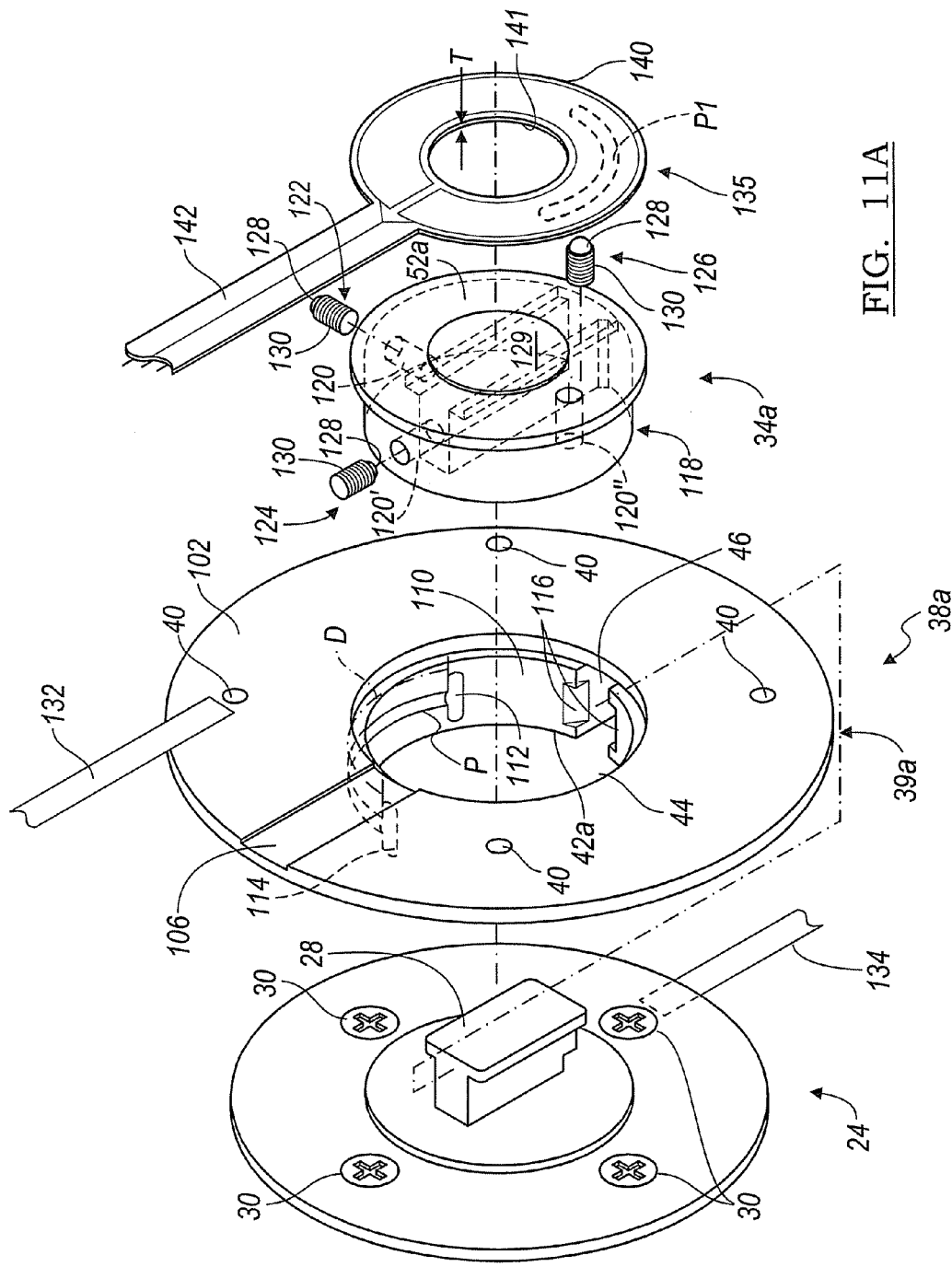
FIG. 11A is an exploded view of the pivot of FIG. 8 from a first perspective.

With reference to FIGS. 10A, 10B, 11A and 11B, the race element 38a includes a base 39a (FIG. 11A), a circular wall 42a defining the socket 44, the entry gap 56 and the entrance guide 58. As the socket 44, entry gap 56 and entrance guide 58 of the race element 38a are substantially similar to the socket 44, entry gap 56 and entrance guide 58 of the race element 38 of the pivot assembly 22, discussed with regard to FIGS. 5-7, the socket 44, entry gap 56 and entrance guide 58 corresponding to the race element 38a will not be discussed in detail herein. The base 39a includes the bores 40, a first surface 102, and a second surface 104. The bores 40 couple the base 39a to the interior overhead structure 14a as discussed previously herein. The first surface 102 of the base 39a is adjacent to the interior overhead structure 14a when the base 39a is coupled to the interior overhead structure 14a. The first surface 102 defines a channel 106 (FIG. 11A). The channel 106 can be machined into the first surface 102, for example, or can be formed with the base 39a. The channel 106 is sized such that a conductor of the communication system 100 can be coupled to the interior overhead structure 14a without contacting the base 39a. The second surface 104 is opposite the first surface 102, and is coupled to the circular wall 42a.

The circular wall 42a can be coupled to the second surface 104, for example, or can be integrally formed with the base 39a. The circular wall 42a includes the upper flange 50, an exterior surface 108 and an interior surface 110. The circular wall 42a also defines the opening 46. As the upper flange 50 and opening 46 are substantially similar to the upper flange 50 and opening 46 of the pivot assembly 22 discussed with regard to FIGS. 1-7, the lower bushing flange 50 and opening 46 will not be discussed herein with regard to the alternative pivot system 22a. The interior surface 110 is opposite the exterior surface 108 and includes a first groove or detent 112, a second groove or detent 114 and a compression slope 116 (FIG. 11A).

The first detent 112 and second detent 114 can each be formed in the interior surface 110 by machining, however, any other technique could be used, and the first detent 112 and second detent 114 could be integrally formed with the interior surface 110. The first detent 112 and second detent 114 are recessed in the interior surface 110 to facilitate engagement of the first detent 112 and second detent 114 with the central engagement bushing 34a, as will be discussed herein. The first detent 112 is generally formed an angular distance D from the second detent 114, where the angular distance D corresponds to the angle of rotation required to move the compartment 16a from the most opened position to the closed position. Thus, the first detent 112 is preferably formed at a point in which the compartment 16a can be removed from the central engagement bushing 34a, and the second detent 114 is preferably formed at a point to prevent the over-rotation of the central engagement bushing 34a after the compartment 16a has reached the closed position, as will be discussed further herein.

The compression slope 116 is generally formed adjacent to the entry gap 56 on the interior surface 110 (FIG. 11A). The compression slope 116 generally constitutes a recessed surface having a slope. The compression slope 116 is configured to interact with the central engagement bushing 34a, as will be discussed herein.

The central engagement bushing 34a includes a body 118 defining an engagement chamber 32a, the gap 36, and a plurality of throughbores 120, 120', 120". The central engagement bushing 34a also includes a first conductive biasing member or conductive spring plunger 122, a second conductive biasing member or conductive spring plunger 124, a non-conductive biasing member or non-conductive spring plunger 126 and a lower bushing flange 52a. As the gap 36 is substantially similar to the gap 36 of the pivot assembly 22 discussed with regard to FIGS. 1-7, the gap 36 will not be discussed herein with regard to the alternative pivot system 22a. The body 118 can be coupled to the lower bushing flange 52a, or could be integrally formed with the lower bushing flange 52a.

The throughbores 120 are defined in the body 118 for receipt of the first, second and third spring plungers 122, 124, 126. The throughbores 120 are preferably threaded to mechanically couple the first, second and third spring plungers 122, 124, 126 to the body 118. A first throughbore 120 is preferably formed or machined such that when the central engagement bushing 34a is coupled to the race element 38a, the first throughbore 120 is aligned with the first detent 112. The second throughbore 120'is preferably formed or machined in a rear surface 127 of the engagement chamber 32a. The third throughbore 120" is preferably formed or machined such that the third spring plunger 126 is in communication with the communication system 100 as will be discussed herein.

The first, second and third spring plungers 122, 124, 126 are coupled to the first, second and third throughbores 120, 120', 120". The first, second and third spring plungers 122, 124, 126 each generally include a nose 128 protruding from a threaded body 130. The threaded body 130 includes an internal biasing member, such as a spring (not shown), to project the nose 128 outwardly from the threaded body 130 to enable the nose 128 to provide accurate, consistent pressure to the selected component, as will be described herein. The first, second and third spring plungers 122, 124, 126 are generally round-nose spring plungers available commercially from McMaster-Carr of Santa Fe Springs, Calif.

Each of the first, second and third spring plungers 122, 124, 126 include a locking element, such as a bonded nylon patch (not shown), to prevent vibrations from unthreading the threaded body 130 from the throughbores 120, 120', 120" and to thereby ensure the nose 128 applies constant pressure even during the rotation of the compartment. Preferably, the first and second spring plungers 122, 124 are composed of a steel, aluminum or other conductive body material with a conductive nose/ball material. The third spring plunger 126 is preferably composed of a steel or aluminum body material with a nylon ball material. Generally, the third spring plunger 126 has a nose 128 with a moderately wide diameter (not specifically shown). Either end of the threaded body 130 of the first, second and third spring plungers 122, 124, 126 includes a tool slot (not shown) to enable the first, second and third spring plungers 122, 124, 126 to be threaded into the respective throughbores 120, 120', 120" with a screwdriver.

The first spring plunger 122 is generally coupled to the first throughbore 120 such that the first spring plunger 122 engages first detent 112 when the central engagement bushing 34a is coupled to the race element 38a. Thus, the first spring plunger 122 can serve to align the central engagement bushing 34a to the race element 38a. The nose 128 of the first spring plunger 122 applies a constant force to the race element 38a to maintain contact between the central engagement bushing 34a and the race element 38a throughout the rotation of the compartment 16a. The first spring plunger 122 can also engage the second detent 114 of the race element 38a in the case where the central engagement bushing 34a over-rotates into the closed position. Thus, generally the first spring plunger 122 follows a path P defined by the angular distance D during the rotation of the compartment 16a.

The second spring plunger 124 is engaged in the second throughbore 120' such that the nose 128 of the second spring plunger 124 contacts the engagement extension 28 of the pivot boss 24 when the engagement extension 28 is coupled to the engagement chamber 32a. Thus, the nose 128 of the second spring plunger 124 provides constant contact between the central engagement bushing 34a and the engagement extension 28 of the pivot boss to enable constant communication between the central engagement bushing 34a and the pivot boss 24 throughout the rotation of the compartment 16a. In addition, the second spring plunger 124 contacts the compression slope 116 of the circular wall 42a in the case where the central engagement bushing 34a over-rotates into the closed position. The compression slope 116 permits gentle recompression of the second spring plunger 124. The third spring plunger 126 is generally coupled to the third throughbore 120" such that the nose 128 of the third spring plunger 126 constantly contacts a conductor of the communication system 100 throughout the rotation of the compartment 16a, as will be discussed herein.

The lower bushing flange 52a is generally circular, and includes a slight outward chamfer 54a for engaging the central engagement bushing 34a with the race element 38a. The lower bushing flange 52a also includes a cylindrical protrusion 129 extending from near a center of the lower bushing flange 52a. The protrusion 129 is sized such that the communication system 100 can be coupled between the interior overhead structure 14a and the central engagement bushing 34a without undue interference from the charged central engagement bushing 34a. Thus, the protrusion 129 generally extends a distance D3 (FIG. 10B) beyond the lower bushing flange 52a to enable a portion of the communication system 100 to be coupled to the interior overhead structure 14a, as will be discussed herein.

Referring to FIGS. 8 and 9, the communication system 100 includes a first conductor 132, a second conductor 134, at least one sensor 135, and a controller 137. The first conductor 132 and second conductor 134 are preferably foil conductors, such as an embedded foil conductor, available commercially from 3M of St. Paul, Minn. The first conductor 132 is coupled to a surface 136 of the interior overhead structure 14a, and the second conductor 134 is coupled to a surface 138 of the compartment 16a. The first and second conductors 132, 134 are preferably coupled to the surfaces 136, 138 through adhesives, however, any suitable mechanism could be used to couple the first and second conductors 132, 134 to the surfaces 136, 138 such as mechanical fasteners, or the first and second conductors 132, 134 could be formed in the interior overhead structure 14a and the compartment 16a.

The first and second conductors 132, 134 are each coupled to the surfaces 136, 138 such that the first and second conductors 132, 134 are incidentally connected to the race element 38a and pivot boss 24, respectively, without the use of wire specific hardware or fasteners. The first and second conductors 132, 134 are capable of enabling electrical communication between the interior overhead structure 14a and the compartment 16a, such as the transfer of power and/or data. Typically, the first and second conductors 132, 134 on one end of the compartment 16a provide the positive polarity connection, while the first and second conductors 132, 134 on the opposite end provide the ground connection. In addition, the first and second conductors 132, 134 are capable of providing data transfer paths by utilizing communication over the power-lines technology, as is generally known, but will be discussed briefly herein. The first conductor 132 is in further communication with the controller 137, as will be discussed herein.

Figure 11B:
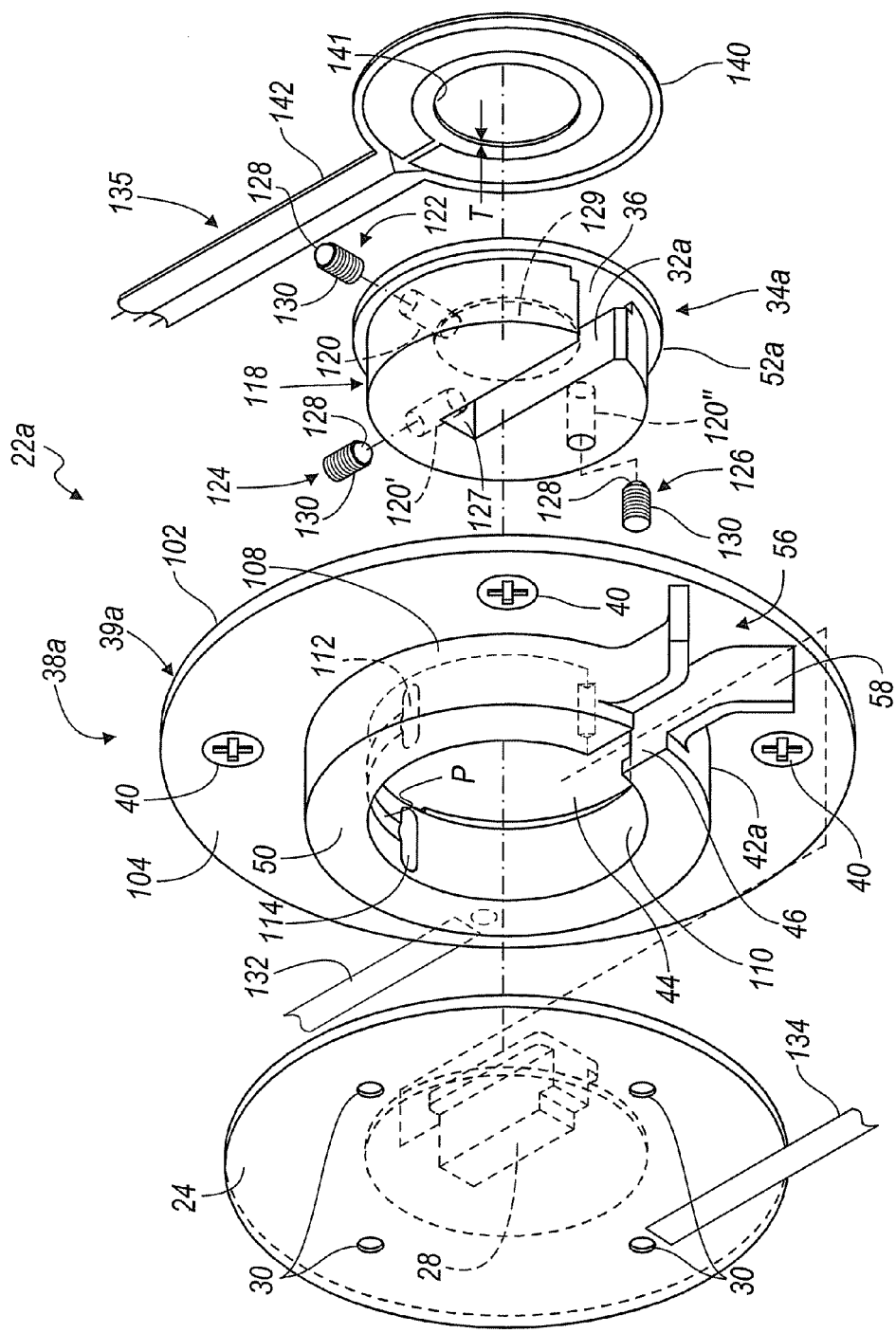
FIG. 11B is an exploded view of the pivot of FIG. 8 from a second perspective.

Referring to FIGS. 11A and 11B, the sensor 135 can be coupled to the interior overhead structure 14a, and includes a circular sensory portion 140 coupled to a conductive tail 142. The circular sensory portion 140 generally includes an aperture 141 sized larger than the protrusion 129 of the lower bushing flange 52a to enable the central engagement bushing 34a to be coupled to the interior overhead structure 14a without contacting the sensor 135. Thus, the circular sensory portion 140 has a thickness T (FIG. 11A) which is smaller than the distance D3 of the extension of the protrusion 129 of the lower bushing flange 52a. The circular sensory portion 140 generally comprises a radial potentiometer, however, any sensor could be employed. Suitable potentiometer position sensors are commercially available from Spectrasymbol of Salt Lake City, Utah, USA. The circular sensory portion 140 is preferably positioned such that the third spring plunger 126 contacts the circular sensory portion 140 along an exemplary path P1 (FIG. 11A) throughout the rotation of the compartment 16a to generate a signal indicative of to the rotational position of the compartment 16a. The conductive tail 142 of the sensor 135 can be integrally formed with the sensor 135, or could be a suitable foil conductor coupled to the circular sensory portion 140. The conductive tail 142 is in communication with the first controller 137 to provide the first controller 137 with the signal from the circular sensory portion 140.

The controller 137 is in communication with the sensor 135 to provide power to and receive data from the sensor 135. The controller 137 is shown coupled adjacent to the interior overhead structure 14a, but the controller 137 could be coupled to the compartment 16a. The controller 137 provides power and transfers data through the first conductor 132.

Generally, in order for the alternative pivot system 22a to provide power and/or data transfer between the compartment 16a and interior overhead structure 14a through the pivot boss 24 and race assembly or race element 38a and central engagement bushing 34a, the central engagement bushing 34a is coupled to the race element 38a. In order to couple the central engagement bushing 34a to the race element 38a, the first, second and third spring plungers 122, 124, 126 are threaded into the first, second and third throughbores 120, 120', 120". Then, the central engagement bushing 34a is slid into the race element 38a such that the first spring plunger 122 enters the first detent 112. This allows the central engagement bushing 34a to be assembled into the race element 38a without the use of special tools.

With the race assembly formed, after the sensor 135, first conductor 132, second conductor 134, and controller 137 are coupled to the interior overhead structure 14a and compartment 16a, the race element 38a and central engagement bushing 34a are coupled to the interior overhead structure 14a through the bores 40 of the race element 38a such that the protrusion 129 is in contact with the interior overhead structure 14a, the nose 128 of the third spring plunger 126 contacts the circular sensory element 140 of the sensor 135, and the conductive tail 142 of the sensor 135 extends through the channel 106 defined in the race element 38a. The race element 38a is also coupled to the interior overhead structure 14a so that the race element 38a is in incidental contact with the first conductor 132. Similarly, the pivot boss 24 is coupled to the compartment 16a such that the pivot boss 24 is in incidental contact with the second conductor 134. The compartment 16a is then coupled to the interior overhead structure 14a as described previously herein.

Once the compartment 16a is coupled to the interior overhead structure 14a, the compartment 16a can be rotated as desired into the opened and closed positions with communication maintained between the interior overhead structure 14a and the compartment 16a through the first spring plunger 122 and second spring plunger 124. As the compartment 16a rotates, the third spring plunger 126 moves along the circular sensory portion 140, and based on the angular position of the third spring plunger 126, the sensor 135 transmits position signals to the controller 137. The controller 137 can receive and transmit signals and/or power through the first conductor 132. The constant communication between the central engagement bushing 34a, race element 38a and pivot boss 24 enables the signal to travel from the first conductor 132 to the second conductor 134 to enable a device coupled to the compartment 16a to perform a desired function. For example, a second sensor S (FIG. 8) in communication with the first conductor 132 could be powered by the alternative pivot system 22a. Signals from the second conductor S could be transmitted through the pivot boss 24, the central engagement bushing 34a and the race element 38a to the controller 137. Further detail regarding the functionality of the compartment 16a is disclosed in commonly assigned United States Patent Application entitled "System and Method for a Power-Assisted Compartment," U.S. Ser. No. 11/510,779, filed on Aug. 25, 2006, and incorporated by reference in its entirety.

It should be noted that various other conductors 134 could be coupled to and in communication with the pivot boss 24 to enable various devices, such as additional sensors, or switches, to be powered through the alternative pivot system 22a. While various embodiments have been described, those skilled in the art will recognize modifications or variations which might be made without departing from the concept disclosed herein. The examples illustrate the disclosure and are not intended to limit it. Therefore, the description and claims should be interpreted liberally with only such limitation as is necessary in view of the pertinent prior art.

What is claimed is:

1. A pivot system comprising:
    a pivot boss including an engagement extension;
    a race assembly including a socket for receipt of the engagement extension to couple the pivot boss to the race assembly;
    at least one conductor coupled to at least one of the pivot boss and race assembly to enable electrical communication between the pivot boss and the race assembly.

2. The pivot system of claim 1, wherein the conductor further comprises a first conductor and a second conductor, the first conductor coupled to the pivot boss, and the second conductor coupled to the race assembly.

3. The pivot system of claim 1, wherein the conductor comprises a foil conductor.

4. The pivot system of claim 1, wherein the race assembly further comprises:
    a race element including the socket; and
    a central engagement bushing rotatably secured within the socket, the central engagement bushing including an engagement chamber for enabling the central engagement bushing to removably engage the engagement extension of the pivot boss through the race element, the central engagement bushing enabling the race element to rotate relative to the pivot boss while remaining longitudinally engaged to the pivot boss.

5. The pivot system of claim 4, wherein the central engagement bushing further comprises:
a body including a flange and defining the engagement chamber above the flange;
a first conductive biasing member coupled to the body to provide a point of continuous contact between the race element and the central engagement bushing; and
a second conductive biasing member coupled to the body to provide a point of continuous contact between the central engagement bushing and the engagement extension of the pivot boss.

6. The pivot system of claim 5, further comprising:
a sensor coupled to the flange of the central engagement bushing; and
at least one non-conductive biasing member coupled to the body of central engagement bushing such that the non-conductive biasing member contacts the sensor, the non-conductive biasing member contacting the sensor to enable the sensor to receive an input indicative of the rotation of the race element relative to the pivot boss.

7. The pivot system of claim 6, wherein the race element further comprises:
a base defining an aperture for receipt of the central engagement bushing and a channel for surrounding a portion of the sensor;
a circular wall extending from the base towards the pivot boss, the circular wall substantially surrounding the aperture;
an entry gap defined in the circular wall to enable the engagement extension to be removably inserted into the engagement chamber when the central engagement bushing is received in the aperture; and
an outwardly flanged entrance guide in communication with the circular wall, the outwardly flanged entrance guide for enabling the engagement extension to be guided into the engagement chamber.

8. The pivot system of claim 7, wherein the circular wall further comprises:
a first detent groove for receipt of the first conductive biasing member in a first position;
a second detent groove for receipt of the first conductive biasing member in a second position; and
wherein in the first position, the first conductive biasing member enables the alignment of the central engagement bushing with the circular wall, and in the second position the first conductive biasing member enables the restriction of the rotation of the central engagement bushing.

9. A method for communicating between a first structure and a second structure through a pivot assembly where the second structure is movable relative to the first structure comprising:
providing a pivot boss including an engagement extension, a race assembly including a race element defining a socket and a central engagement bushing including an engagement chamber for receipt of the engagement extension, and at least one conductor;
coupling the central engagement bushing to the socket;
coupling the race element to the first structure;
coupling the pivot boss to the second structure;
coupling a conductor to the first structure and the second structure; and
coupling the engagement extension to the engagement chamber to enable communication between the first structure and the second structure.

10. The method of claim 9, further comprising:
providing a first detent formed in the socket;
coupling a first conductive biasing member to the central engagement bushing; and
engaging the first conductive biasing member with the first detent to enable constant contact between the central engagement bushing and the race element.

11. The method of claim 9, further comprising:
coupling a second conductive biasing member to the central engagement bushing such that the second conductive biasing member contacts the engagement extension to maintain contact between the central engagement bushing and the engagement extension.

12. The method of claim 9, further comprising:
providing a controller coupled to the second structure and a sensor;
coupling the conductor to the pivot boss;
coupling the conductor to the controller;
coupling the sensor between the race element and the first structure;
coupling a non-conductive biasing member to the central engagement bushing such that the non-conductive biasing member extends beyond a surface of the central engagement bushing to contact the sensor; and
transmitting the signal from the sensor to the controller through a conductor.

13. A pivot system comprising:
a pivot boss including an engagement extension;
a race element including a socket;
a central engagement bushing rotatably secured within the socket to enable the race element to rotate relative to the pivot boss while remaining longitudinally engaged to the pivot boss, the central engagement bushing including a body having a flange, the body defining an engagement chamber above the flange that enables the central engagement bushing to removably engage the engagement extension of the pivot boss through the race element, the body including a first conductive biasing member that provides a point of continuous contact between the race element and the central engagement bushing and a second conductive biasing member that provides a point of continuous contact between the central engagement bushing and the engagement extension of the pivot boss;
a sensor coupled to the flange of the central engagement bushing; and
at least one non-conductive biasing member coupled to the body of central engagement bushing such that the non-conductive biasing member contacts the sensor, the non-conductive biasing member contacting the sensor to enable the sensor to receive an input indicative of the rotation of the race element relative to the pivot boss.

14. The pivot system of claim 13, wherein the race element further comprises:
a base defining an aperture for receipt of the central engagement bushing and a channel for surrounding a portion of the sensor;
a circular wall extending from the base towards the pivot boss, the circular wall substantially surrounding the aperture;
an entry gap defined in the circular wall to enable the engagement extension to be removably inserted into the engagement chamber when the central engagement bushing is received in the aperture; and
an outwardly flanged entrance guide in communication with the circular wall, the outwardly flanged entrance guide for enabling the engagement extension to be guided into the engagement chamber.

15. The pivot system of claim 14, wherein the circular wall further comprises:
a first detent groove for receipt of the first conductive biasing member in a first position;

a second detent groove for receipt of the first conductive biasing member in a second position; and wherein in the first position, the first conductive biasing member enables the alignment of the central engagement bushing with the circular wall, and in the second position the first conductive biasing member enables the restriction of the rotation of the central engagement bushing.

* * * * *